United States Patent [19]
King

[11] Patent Number: 5,748,694
[45] Date of Patent: May 5, 1998

[54] FUEL BUNDLE FILTER FOR A NUCLEAR REACTOR FUEL BUNDLE ASSEMBLY

[75] Inventor: Harold B. King, Wrightsville Beach, N.C.

[73] Assignee: General Electric Company, Schenectady, N.Y.

[21] Appl. No.: 621,595

[22] Filed: Mar. 26, 1996

[51] Int. Cl.[6] ............................. G21C 3/32; G21C 15/02
[52] U.S. Cl. .......................... 376/313; 376/352; 376/440; 210/131
[58] Field of Search .................................. 376/352, 313, 376/446, 443, 440; 210/130, 131

[56] References Cited

U.S. PATENT DOCUMENTS

| | | |
|---|---|---|
| 1,240,081 | 9/1917 | Moss . |
| 1,504,233 | 8/1924 | Graham . |
| 1,992,472 | 2/1935 | Craig . |
| 3,414,474 | 12/1968 | Swanson . |
| 3,548,885 | 12/1970 | Kumpf . |
| 3,725,199 | 4/1973 | Notari et al. . |
| 3,801,453 | 4/1974 | Jones . |
| 3,840,051 | 10/1974 | Akashi et al. . |
| 3,878,870 | 4/1975 | Atherton et al. . |
| 3,879,259 | 4/1975 | Persson et al. . |
| 3,945,883 | 3/1976 | Hind et al. . |
| 3,971,698 | 7/1976 | Wolff et al. . |
| 4,032,398 | 6/1977 | Cross et al. . |
| 4,036,690 | 7/1977 | Betts et al. . |
| 4,053,358 | 10/1977 | Pennell . |
| 4,053,359 | 10/1977 | Pennell et al. . |
| 4,076,586 | 2/1978 | Bideau et al. . |
| 4,096,032 | 6/1978 | Mayers et al. . |
| 4,116,764 | 9/1978 | Jones ........................................ 376/313 |
| 4,198,272 | 4/1980 | Salmon . |
| 4,391,771 | 7/1983 | Anthony .................................... 326/446 |
| 4,412,969 | 11/1983 | Tilbrook et al. . |
| 4,420,457 | 12/1983 | Le Pargneux . |
| 4,427,624 | 1/1984 | Marlatt et al. . |
| 4,446,099 | 5/1984 | Schwind et al. . |
| 4,505,877 | 3/1985 | Rion . |
| 4,610,838 | 9/1986 | Gasparro et al. . |
| 4,614,636 | 9/1986 | Walters . |
| 4,615,862 | 10/1986 | Huckstein . |

(List continued on next page.)

FOREIGN PATENT DOCUMENTS

| | | |
|---|---|---|
| 0196611 | 8/1986 | European Pat. Off. . |
| 0289829 | 4/1988 | European Pat. Off. . |
| 0311037 | 12/1989 | European Pat. Off. . |
| 0435744 A1 | 3/1991 | European Pat. Off. . |
| 0455011 A1 | 4/1991 | European Pat. Off. . |
| 0432738 A1 | 12/1991 | European Pat. Off. . |
| 0432739 A1 | 12/1991 | European Pat. Off. . |
| 0466553 A1 | 7/1992 | European Pat. Off. . |
| 4006264 A1 | 2/1991 | Germany . |
| 54-102493 | 8/1973 | Japan . |
| 54-19080 | 2/1979 | Japan . |
| 54-141989 | 5/1979 | Japan . |
| 57-102215 | 6/1982 | Japan . |
| 60-162985 | 8/1985 | Japan . |
| 62-96891 | 5/1987 | Japan . |
| 63-157093 | 6/1988 | Japan . |
| 63-61183 | 8/1988 | Japan . |
| 64-39593 | 2/1989 | Japan . |
| 64-83189 | 3/1989 | Japan . |
| 3-111795 | 5/1991 | Japan . |
| 3-274491 | 12/1991 | Japan . |
| 465644 | 6/1991 | Sweden . |
| 901044066.5 | 12/1990 | Switzerland . |
| 1214998 | 12/1970 | United Kingdom . |

*Primary Examiner*—Harvey E. Behrend
*Attorney, Agent, or Firm*—Nixon & Vanderhye P.C.

[57] ABSTRACT

A fuel bundle for a nuclear reactor includes a plurality of fuel rods extending between upper and lower tie plates, and a filter plate seated on the lower tie plate. The filter plate includes a substantially planar plate having a plurality of fuel rod holes in a predetermined array, the plate having web areas between the fuel rod holes which are formed with a plurality of smaller debris filter holes. At least one of the web areas is formed to include a spring tab pivotable out of the plane of the plate so that in the event of debris overload, coolant can bypass the smaller debris filter holes.

11 Claims, 3 Drawing Sheets

U.S. PATENT DOCUMENTS

| | | | |
|---|---|---|---|
| 4,634,525 | 1/1987 | Yant | 376/313 |
| 4,636,525 | 1/1987 | Yant . | |
| 4,652,425 | 3/1987 | Ferrari et al. . | |
| 4,655,996 | 4/1987 | Freeman et al. . | |
| 4,664,880 | 5/1987 | Bryan | 376/352 |
| 4,678,627 | 7/1987 | Rylatt . | |
| 4,684,495 | 8/1987 | Wilson et al. . | |
| 4,684,496 | 8/1987 | Wilson et al. . | |
| 4,716,012 | 12/1987 | Gasparro et al. . | |
| 4,772,447 | 9/1988 | Manson et al. . | |
| 4,781,884 | 11/1988 | Anthony . | |
| 4,826,653 | 5/1989 | Nylund et al. . | |
| 4,828,791 | 5/1989 | DeMario . | |
| 4,832,905 | 5/1989 | Bryan et al. . | |
| 4,849,161 | 7/1989 | Brown et al. . | |
| 4,900,507 | 2/1990 | Shallenberger et al. . | |
| 4,919,883 | 4/1990 | Bryan et al. . | |
| 4,980,121 | 12/1990 | Roberts et al. . | |
| 5,009,839 | 4/1991 | King . | |
| 5,024,806 | 6/1991 | Cioffi et al. . | |
| 5,024,807 | 6/1991 | Hatfield et al. . | |
| 5,030,412 | 7/1991 | Yates et al. | 376/352 |
| 5,037,605 | 8/1991 | Riordan, III . | |
| 5,066,453 | 11/1991 | Nylund . | |
| 5,071,617 | 12/1991 | Bryan et al. . | |
| 5,094,802 | 3/1992 | Riordan, III | 376/352 |
| 5,100,611 | 3/1992 | Nylund . | |
| 5,106,575 | 4/1992 | Nakamura et al. . | |
| 5,128,096 | 7/1992 | Grattier . | |
| 5,135,710 | 8/1992 | Grattier et al. . | |
| 5,160,697 | 11/1992 | Verdier et al. . | |
| 5,180,545 | 1/1993 | Grattier | 326/352 |
| 5,219,517 | 6/1993 | Nylund | 376/352 |
| 5,255,152 | 10/1993 | Verdier . | |
| 5,282,231 | 1/1994 | Adams et al. . | |
| 5,309,491 | 5/1994 | Lippert et al. | 376/352 |
| 5,345,483 | 9/1994 | Johansson . | |
| 5,365,558 | 11/1994 | Lippert . | |
| 5,384,814 | 1/1995 | Matzner et al. . | |
| 5,390,220 | 2/1995 | Zuloaga et al. . | |
| 5,390,221 | 2/1995 | Dix et al. . | |
| 5,420,901 | 5/1995 | Johansson . | |
| 5,473,650 | 12/1995 | Johansson . | |
| 5,483,564 | 1/1996 | Matzner et al. . | |
| 5,488,634 | 1/1996 | Johansson et al. . | |
| 5,519,745 | 5/1996 | Proebstle et al. | 376/313 |
| 5,539,793 | 7/1996 | Johansson et al. | 376/352 |

FUEL BUNDLE FILTER FOR A NUCLEAR REACTOR FUEL BUNDLE ASSEMBLY

TECHNICAL FIELD

The present invention relates to a fuel bundle filter for a nuclear reactor fuel bundle assembly, and particularly relates to a relatively thin filter plate having a first plurality of openings corresponding to the array of fuel and water rod(s) in the bundle, and a second plurality of small openings for separating debris from the flow of water coolant through the filter plate. The filter plate also includes a flow bypass mechanism in the event of a debris overload.

BACKGROUND

Boiling water nuclear reactors have been in operation for many years. Commencing with their initial construction and throughout their service lives, these reactors may accumulate debris in their closed circulation moderator systems. This debris can become an operating hazard if it is allowed to enter into the fuel bundle core region containing the heat generating fuel rods. In order to understand this problem, a summary of reactor construction as it relates to the accumulation of debris in the core is provided below.

In boiling water nuclear reactor construction, the reactor is provided with a large, central core. Liquid water coolant/moderator flow enters the core from the bottom and exits the core as a water steam mixture from the top. The core includes many side-by-side fuel bundles, each containing a plurality of fuel rods. Water is introduced into each fuel bundle through a fuel bundle support casting from a high pressure plenum situated below the core. Water passes in a distributed flow through the individual fuel bundles and about the fuel rods, is heated to generate steam, and exits the upper portion of the core as a two-phase water steam mixture from which the steam is extracted for the generation of energy. To insure uniformity of moderator flow, one or more water rods may be located centrally of each bundle, for delivering liquid coolant to the upper portion of the bundle.

The fuel bundles for a boiling water nuclear reactor include a fuel rod supporting lower tie plate assembly. Typically, this is a one or two piece cast structure including an upper grid, a lower inlet nozzle and a structure providing a transition region from the inlet to the grid. The inlet nozzle provides for coolant entry to an enlarged flow volume within the flow transition region of the lower tie plate assembly. At the upper end of the flow volume, there is located a tie plate grid defining with the nozzle a flow volume. The lower tie plate grid has two purposes. First, it provides the mechanical support connection for the weight of the individual fuel rods to be transmitted through the entire lower tie plate assembly to the fuel support casting. Secondly, the lower tie plate grid provides a path for liquid water moderator to flow into the fuel bundle for passage between the side-by-side supported fuel rods, and into the one or more water rods which are also supported on the lower tie plate grid.

Above the lower tie plate grid, each fuel bundle includes a matrix of upstanding fuel rods—sealed tubes each containing fissionable material which, when undergoing nuclear reaction, transfers energy to the flowing water to produce the power generating steam. An upper tie plate assembly holds at least some of the fuel rods (and the one or more water rods) in vertical side-by-side alignment. Some of the fuel rods may be rigidly attached to both the upper and lower tie plate assemblies.

Fuel bundles also include a number of fuel rod spacers at varying elevations along the length of each fuel bundle. The spacers provide appropriate lateral restraints for each fuel rod at their respective elevations and thus prevent abrading contact between the fuel rods. They also maintain the fuel rods at uniform spacing relative to one another along the length of the fuel bundle for optimum performance. It will be appreciated, however, that these spacers are sites where debris can be trapped and damage the fuel rods.

Each fuel bundle is surrounded by an open-ended channel. This channel causes water flowing between the upper and lower tie plate assemblies to be restricted to only one bundle in an isolated flow path between the tie plate assemblies. The channel also serves to separate the steam generating flow path through the fuel bundles from the surrounding core bypass region, this region being utilized for the penetration of the control rods.

With respect to the tie plate grid of the lower tie plate assembly, a matrix of cylindrical bosses and webs generally form the grid. The bosses are sized to receive the fuel rod end plugs. The spacing and thickness of the bosses and webs are primary factors in controlling pressure drop resulting from water flow through the grid. While there have been many design changes in grid and bundle construction, it is still necessary to avoid significantly altering the pressure drop across the lower tie plate assembly. For example, a core may be composed of older (8×8) bundles and newer (11×11) bundles. One challenge with new fuel bundle constructions, and particularly, lower tie plate grid constructions, is to accommodate more fuel rods and perform debris catching functions yet maintain a pressure drop equivalent to the pressure drop resulting from older bundle constructions.

Typically, debris within boiling water nuclear reactors can include extraneous materials left over from reactor construction, and debris liberated from corrosion during the reactor lifetime. During the numerous outages and repairs, further debris may accumulate. Because nuclear reactors constitute closed circulation systems, it will be appreciated that debris will essentially accumulate in any event with increasing age and use of the reactor. A particularly vexing and usual place for the accumulation of debris is in the fuel bundles between the fuel rods, particularly in the vicinity of the fuel rod spacers. It will be recalled that each fuel rod is surrounded by a spacer at the particular elevation of the spacer. Debris particles tend to lodge between the spacer structure and the fuel rods and often dynamically vibrate with the coolant/moderator flow in abrading contact to the sealed cladding of the fuel rods.

Debris catching screens and plates located in the vicinity of the lower tie plate are well known, and are well represented in the patent literature. See, for example, U.S. Pat. Nos. 3,801,453; 4,420,457; 4,427,624; 4,664,880; 4,828,791; 5,037,605; 5,135,710; 5,219,517; and 5,390,221.

A problem with known debris catcher construction, however, is the potential for debris overload which may sharply reduce coolant flow to the fuel bundles.

DISCLOSURE OF THE INVENTION

The present invention provides a debris catcher filter plate, preferably for location on the upper surface of the lower tie plate grid, and which provides debris filtering under normal operation but which permits coolant to bypass the filter plate under adverse conditions such as debris overload which could otherwise negatively impact operation of the fuel bundles.

In the exemplary embodiment, the debris filter comprises a relatively thin plate formed with relatively large holes arranged in an array corresponding to the fuel rod array and to the one or more water rods usually enclosed within the array. Between the larger holes are patterns or nests of smaller filter or debris catcher holes. For essentially all rows and columns of fuel rod holes (with the exception of the outermost rows and columns defining the four sides of the bundle and certain interior rows or columns adjacent the water rod holes), each array of four larger fuel or water rod holes surround a nest of, for example, five smaller debris holes. It will be appreciated that the pattern varies not only in the peripheral area of the bundle, but in the interior area of the bundle in the vicinity of the one or more water rods as well. The smaller debris catcher holes are sized and arranged to trap debris of a certain size below the plate and thus prevent intrusion of such debris into the core region between the fuel rods, and particularly into the region of the first spacer.

The filter plate in accordance with this invention is intended for placement on the upper surface of the lower tie plate grid, but other locations are possible. In the exemplary embodiment, the filter plate is held in place by the weight of the fuel rods.

In all cases, the plate material which defines one or more, or all, of the fuel and/or water rods (and preferably including any fuel rod which also serves as a tie rod) is formed to include a spring locking device which acts as a spring hold down to keep the filter plate tightly against the lower tie plate. In the specific embodiment described herein, three-sided tabs (one side defined by the hole boundary) are circumferentially spaced about the fuel rod (and/or water rod hole), and bent slightly upwardly out of the plane of the plate. The resilient frictional contact generated when the fuel rods are pushed through the holes will bias and hold the filter plate against the underlying lower tie plate.

A debris filter hole bypass feature in accordance with this invention relates to the nests of debris filter holes in the areas between the arrays of fuel rods and water rods. It will be appreciated that each nest is bounded on four (or more) sides by solid plate material. In the exemplary embodiment, the plate is punched or cut on three sides of one or all of the nests to form one or more corresponding spring tabs, bendable about the uncut side. In the outer most peripheral area of the plate, where the "nests" have an asymmetrical shape, the spring tabs may be omitted. It is readily apparent that the spring tab feature is more easily implemented in the areas where the nests of debris filter holes are symmetrical.

During reactor operation, and in the event the filter holes are plugged or partially clogged with debris, the spring tabs move out of the plane of the plate, thereby permitting coolant to bypass the filter holes and thus maintain adequate cooling to the fuel bundle. While it is possible that some small debris may also flow through the spring tab opening, such debris will be of a size which will not impact on reactor operation, but it will be appreciated that, in term of priorities, it is more important to maintain coolant flow through the bundle.

It is another feature of the invention that the debris filter holes be sized and shaped to enhance flow and/or to direct the flow of coolant in the desired direction.

Accordingly, in its broader aspects, the present invention relates to a debris filter plate for a nuclear reactor fuel bundle comprising a substantially planar plate having a plurality of fuel rod holes in a predetermined array, the plate having web areas between the fuel rod holes, each web area formed with a plurality of smaller debris filter holes, at least one web area partially cut from the plate to form a spring tab containing the debris filter holes and pivotable out of the plane of the plate.

In another aspect, the invention relates to a debris filter plate for a nuclear reactor fuel bundle comprising a substantially planar plate having a plurality of fuel rod holes in a predetermined array, the plate having web areas between the fuel rod holes which are formed with a plurality of smaller debris filter holes, wherein at least one of the fuel rod holes is bounded by a plurality of bendable spring strips.

In still another aspect, the invention relates to a fuel bundle for a nuclear reactor comprising a plurality of fuel rods extending between upper and lower tie plates; and, a filter plate seated on the lower tie plate, the filter plate comprising a substantially planar plate having a plurality of fuel rod holes in a predetermined array, the plate having web areas between the fuel rod holes which are formed with a plurality of smaller debris filter holes, at least one of the web areas formed to include a spring tab pivotable out of the plane of the plate.

Other objects and advantages of the invention will become apparent from the detailed description which follows.

BEST MODE FOR CARRYING OUT THE INVENTION

Figure 1:
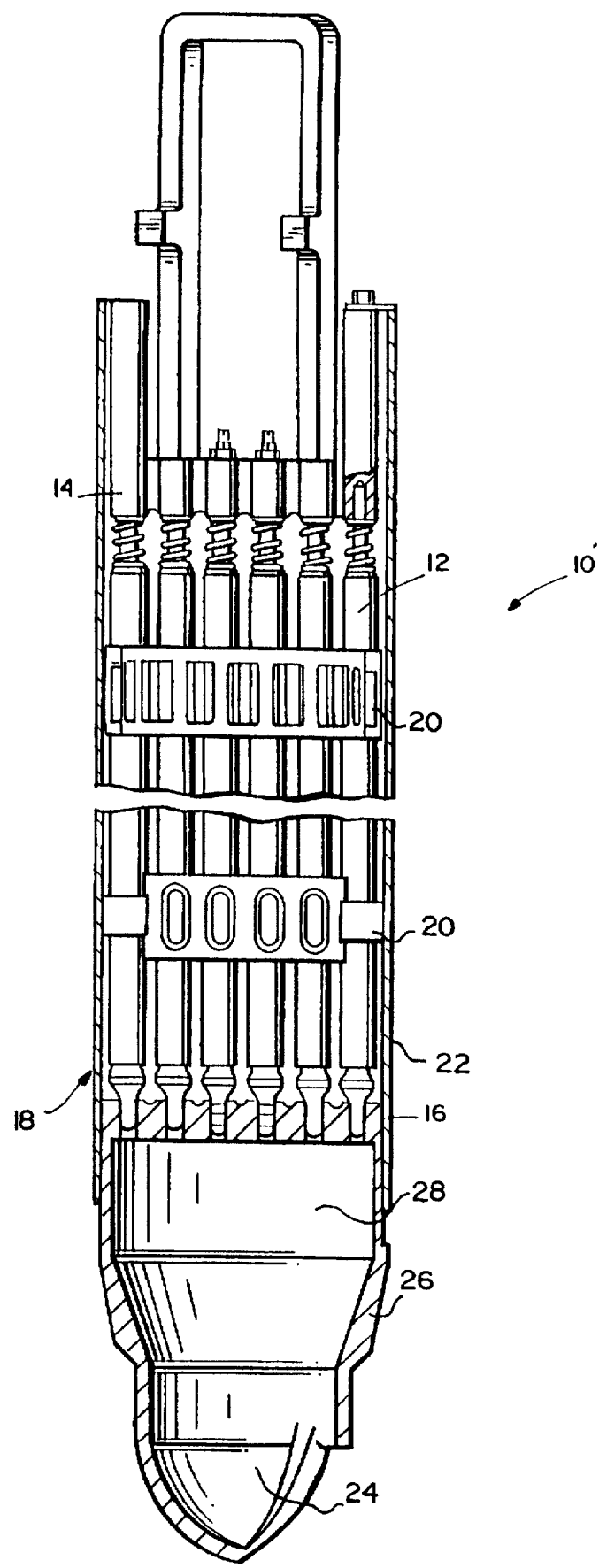
FIG. 1 is a vertical cross-sectional view of a conventional fuel assembly illustrating a fuel bundle supported on a lower tie plate assembly.

Referring now to FIG. 1, a fuel bundle assembly 10 includes a plurality of fuel rods 12 connected at their upper ends to an upper tie plate 14, and supported at their lower ends in a lower tie plate grid, generally designated 16, which, in turn, forms part of a lower tie plate assembly, generally designated 18. Fuel rod spacers 20 are arranged at a plurality of vertically spaced locations to maintain lateral spacing of the fuel rods 12 relative to one another and to prevent vibration during operation. The fuel bundle is disposed within a fuel bundle channel 22 so that coolant water supplied through the bottom nozzle or inlet opening 24 of the lower tie plate assembly 18 flows upwardly therefrom through a transition structure 26 defining an enlarged flow volume 28, and through the lower tie plate grid 16 into the fuel rod region where steam is generated. As indicated previously, it is important that debris in the flow of the coolant water be prevented from flowing into the area between the fuel rods. Accordingly, a debris filter plate 30 as shown in FIG. 2 is preferably mounted on the lower tie plate grid 16.

Figure 2:
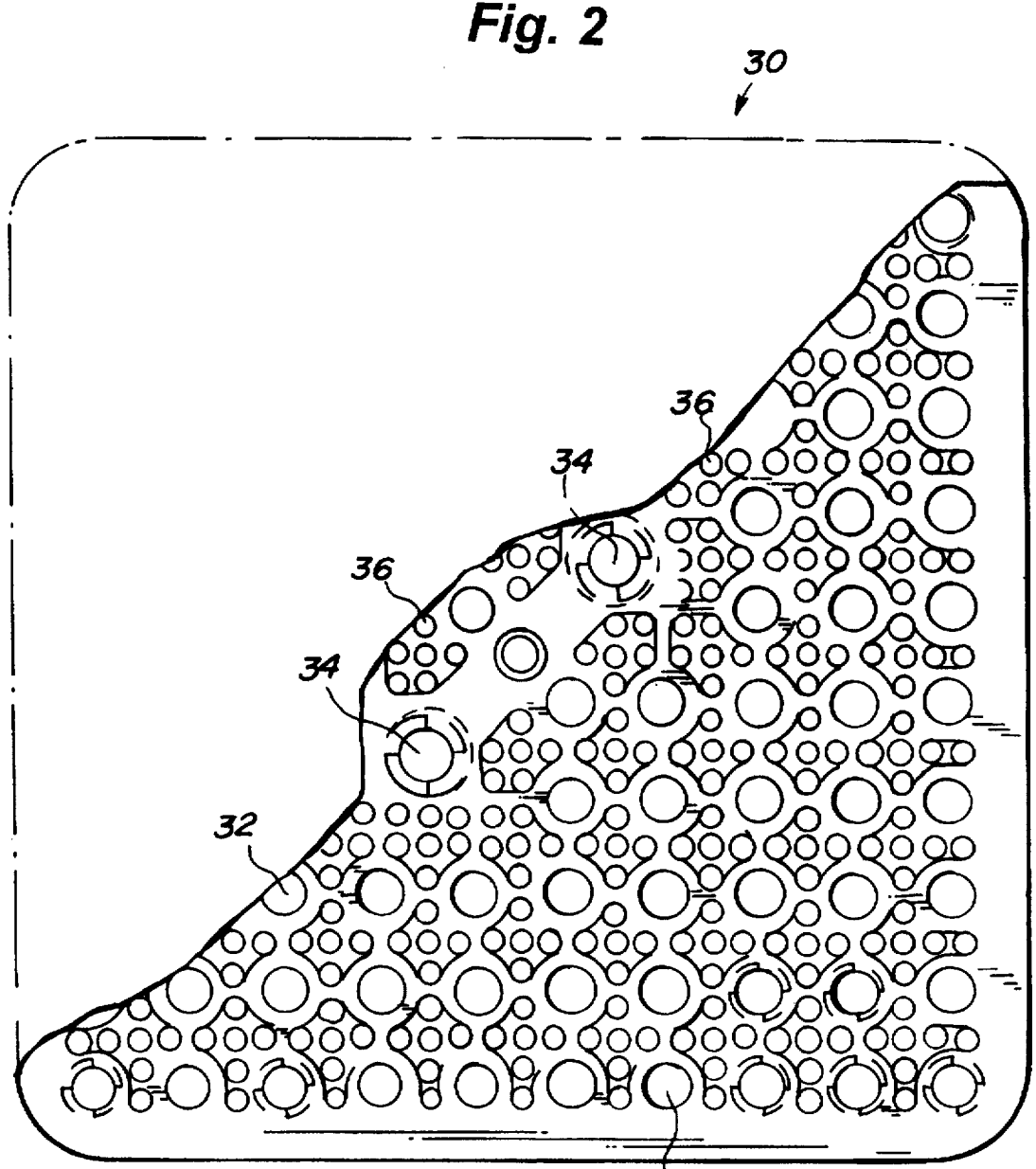
FIG. 2 is an enlarged top plan view of a debris filter in accordance with the present invention.

Turning to FIG. 2, the debris filter plate 30 is seated on the upper surface of the lower tie plate grid 16. A suitable material for the filter plate is X-750 stainless, of a thickness designed to provide coolant flow relief as explained below.

The plate 30 is punched, formed, machined, or chemically milled to include the pattern of holes which include fuel rod holes 32 and one or more water rod holes 34 which correspond generally in size and shape to similar holes in the lower tie plate 16. Smaller debris filter holes 36 are similarly formed in the plate, between the fuel rod holes 32 and in the vicinity of water rod holes 34. Generally, each group of four fuel rod holes 32 surrounds and defines a "nest" of five debris filter holes 36 (see FIG. 5). In other words, the solid plate material between four holes 32 is used to locate the pattern of five debris holes 36. It can be seen that the pattern of debris filter holes varies somewhat in the outer peripheral rows and columns of fuel rod holes 32 and in the area immediately adjacent the water rod holes 34. Other patterns of debris filter holes may be equally suitable, recognizing, however, that the array of fuel rod and water rod holes generally dictates what areas remain for carrying out the debris filtering function.

Figure 3:
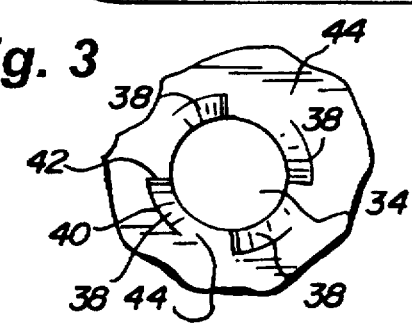
FIG. 3 is an enlarged detail 2A taken from FIG. 2.
Figure 4:
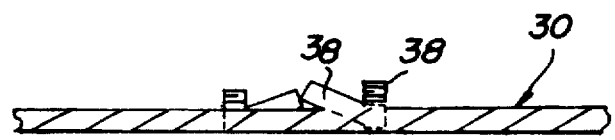
FIG. 4 is a front elevation of FIG. 3.

Turning now to FIG. 3, one of the principal features of this invention involves the incorporation of spring strips 38 around each or any number of holes 32, 34 for the fuel rods (including tie rods) and/or water rods. Each strip 38 comprises an elongated, partial circumferential cut 40 and a radial cut 42 connecting the parallel cut 40 at one end thereof to the hole 32. The cut line 40 is parallel to the surface defining the hole 32, and thus, three sides of the strip 38 is free to flex about its opposite transverse end 44. In the exemplary embodiment, four such spring tabs or strips 38 are circumferentially spaced about the fuel rod hole 32. FIG. 4 illustrates the manner in which the tabs 38 are bent upwardly out of the plane of the plate 30. As the fuel rods and/or water rods are inserted through the various holes 32 and/or 34, the spring tabs or strips 38 will keep the plate 30 biased tightly against the top of the lower tie plate 16.

Figure 5:
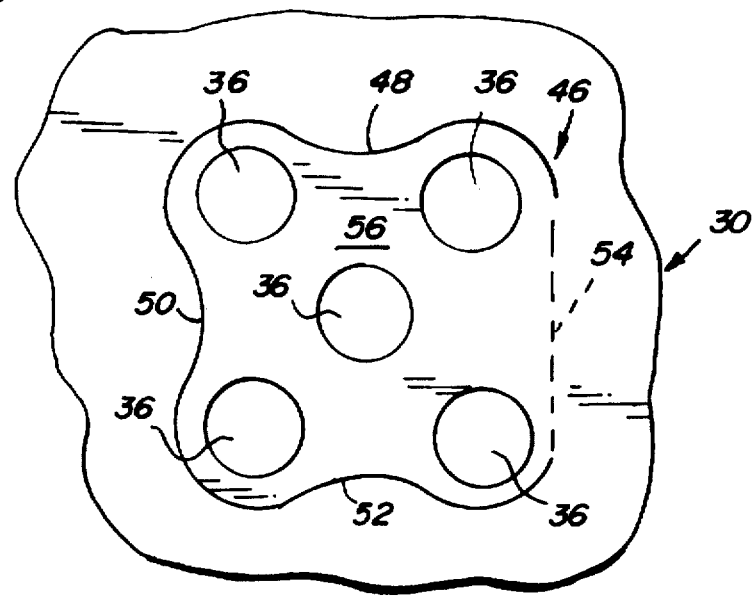
FIG. 5 is an enlarged plan detail 5A taken from FIG. 2.
Figure 6:
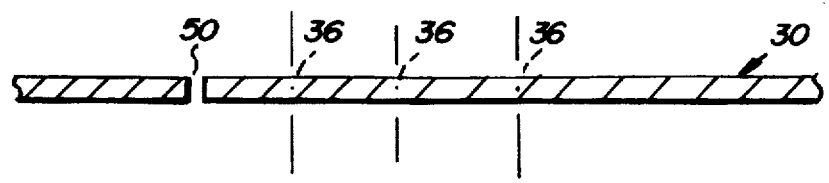
FIG. 6 is a front elevation of FIG. 5.

Turning now to FIG. 5, a "nest" 46 of debris holes 36 is shown in a pattern of five such holes, with one at each corner and one in the middle of a generally square array between four larger fuel rod holes 32 (not shown in FIG. 5). The periphery of the nest is punched out on three sides 48, 50 and 52, leaving an uncut boundary (shown in phantom at 54) to serve as a hinge between opposite sides 50, 52. In other words, the nest 46 is reformed into a spring tab 56 pivotable out of the plane of the plate 30.

In each of the two above described tab configurations, the material from which plate 30 is formed, has sufficient strength and resiliency to resist normal flow of coolant—and thus also perform a debris filtering function as in the case of conventional debris filter or catcher plates. When an unusual event occurs, however, such as when the amount of debris captured at the plate 30 is sufficient to restrict flow to a minimum pressure, the spring tabs 56 will open by flexing upwardly (in the direction of coolant flow) out of the plane 30, allowing the coolant to bypass the debris filter holes and thus maintain a minimum required flow.

Figure 7:
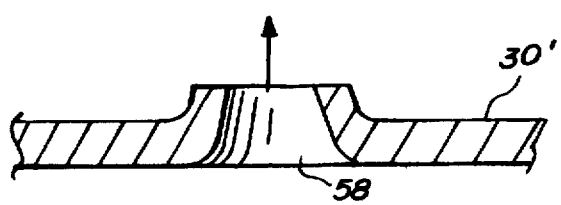
FIGS. 7 and 8 are partial sections of alternative debris hole configurations for the filter plate in accordance with this invention.
Figure 8:
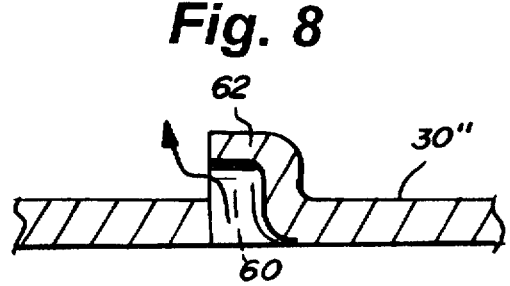

With reference now to FIGS. 7 and 8, it is also possible to enhance and/or direct the coolant flowing through the debris filter holes in plate 30. For example, rather than the flat holes 36, the debris filter hole 58 in FIG. 7 is punched from the debris filter plate 30' to include a venturi-like orifice to speed up the flow through the hole. In FIG. 8, the debris filter hole 60 is partially punched through the plate 30" and then reformed to have a flow direction "hood" 62 which causes the flow to diver from a straight flow path to one side as indicated by the flow arrow. It will be understood that the debris filter holes can be formed in other ways as well in accordance with specific applications of the invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A debris filter plate for a nuclear reactor fuel bundle comprising:
a substantially planar plate having a plurality of fuel rod holes in a predetermined array, each fuel rod hole adapted to receive a lower end of an associated fuel rod, said plate having web areas between said fuel rod holes, each web area formed with a plurality of smaller debris filter holes, at least one of said web areas partially cut from said plate to form a spring tab including said plurality of smaller debris filter holes pivotable out of the plane of said plate.

2. The debris filter plate of claim 1 wherein said spring tab is substantially square in shape, and defined by cut lines on three sides thereof.

3. The debris filter plate of claim 1 wherein a plurality of web areas are formed to include spring tabs, at least some of said spring tabs being asymmetrical in shape and defined by cut lines extending from opposite ends of an uncut hinge.

4. The debris filter plate of claim 2 wherein a first plurality of said web areas are symmetrical in shape and a second plurality of said web areas are asymmetrical in shape.

5. The debris filter plate of claim 3 wherein at least some of said debris filter holes in said plate are formed to divert coolant from a straight flow path.

6. The debris filter plate of claim 1 wherein at least one of said fuel rod holes is bounded by a plurality of bendable spring strips.

7. The debris filter plate of claim 1 wherein all of said fuel rod holes are bounded by a plurality of bendable spring strips.

8. The debris filter plate of claim 1 wherein said plate is also formed with at least one water rod hole adapted to receive a lower end of an associated water rod, said at least one water rod hole bounded by a plurality of bendable spring strips.

9. The debris filter of claim 6 wherein said plate is also formed with at least one water rod hole, said at least one water rod hole bounded by a plurality of bendable spring strips, said water rod hole adapted to receive a lower end of an associated water rod.

10. A fuel bundle for a nuclear reactor comprising a plurality of fuel rods extending between upper and lower tie plates; and a filter plate seated on said lower tie plate, said filter plate comprising:
a substantially planar plate having a plurality of fuel rod holes in a predetermined array and in alignment with corresponding fuel rod holes in said lower tie plate, said plurality of fuel rods extending through said fuel rod holes in said planar plate and seated on said corresponding holes in said lower tie plate, said plate having web areas between said fuel rod holes which are formed with a plurality of smaller debris filter holes, at least one of said web areas formed as a spring tab including said plurality of smaller debris filter holes pivotable out of the plane of said plate.

11. The debris filter plate of claim 10 wherein at least one of said fuel rod holes is bounded by a plurality of bendable spring strips.

* * * * *